(12) United States Patent
Shawabkeh

(10) Patent No.: US 9,102,542 B1
(45) Date of Patent: Aug. 11, 2015

(54) METHOD OF PRODUCING ACTIVATED CARBON FROM FUEL OIL

(71) Applicant: KING FAHD UNIVERSITY OF PETROLEUM AND MINERALS, Dhahran (SA)

(72) Inventor: Reyad Awwad Khalaf Shawabkeh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/182,122

(22) Filed: Feb. 17, 2014

(51) Int. Cl.
*B01J 20/20* (2006.01)
*C01B 31/12* (2006.01)
*B01J 20/30* (2006.01)
*C01B 31/08* (2006.01)

(52) U.S. Cl.
CPC ............. *C01B 31/12* (2013.01); *B01J 20/3078* (2013.01); *C01B 31/08* (2013.01)

(58) Field of Classification Search
CPC .......... B01J 20/20; C01B 31/10; C01B 31/12; C01B 31/087; C01B 31/083
USPC .................................. 502/416, 417, 426, 428
See application file for complete search history.

(56) References Cited

U.S. PATENT DOCUMENTS

| 4,569,756 A | 2/1986 | Klein |
| 4,760,046 A | 7/1988 | Burger et al. |
| 5,338,462 A * | 8/1994 | Abe et al. ........................ 210/757 |
| 6,225,256 B1 | 5/2001 | Shawabkeh et al. |
| 6,258,334 B1 | 7/2001 | Gadkaree et al. |
| 2008/0152577 A1* | 6/2008 | Addiego et al. ................ 423/460 |
| 2008/0248355 A1* | 10/2008 | Katamura et al. ............... 429/27 |

FOREIGN PATENT DOCUMENTS

KR  1020000052120 A2 *  8/2000  .............. C01B 31/08

OTHER PUBLICATIONS

Liu, Qing-Song, et al. "Modification of bamboo-based activated carbon using microwave radiation and its effects on the adsorption of methylene blue." Applied Surface Science 256.10 (2010): 3309-3315.*
Gómez-Serrano, Vicente, et al. "Formation of oxygen structures by air activation. A study by FT-IR spectroscopy." Carbon 37.10 (1999): 1517-1528.*
Liu, Wei et al., "Optimization of Sulfur Impregnation Protocol for Fixed-Bed Application of Activated Carbon-Based Sorbents for Gas-Phase Mercury Removal", Environ. Sci. Technol., 1998, 32, 531-538.

* cited by examiner

*Primary Examiner* — Richard M Rump
(74) *Attorney, Agent, or Firm* — Richard C Litman

(57) ABSTRACT

The method of producing activated carbon from fuel oil includes mixing the fuel oil with an activating chemical at room temperature to produce an activated fuel oil, carbonizing the activated fuel oil to produce activated carbon, and optionally washing the activated carbon produced. The produced activated carbon has high efficiency and it may be activated in a process that requires a comparatively low amount of energy, thus allowing the activated carbon to be regenerated in-situ.

18 Claims, 1 Drawing Sheet

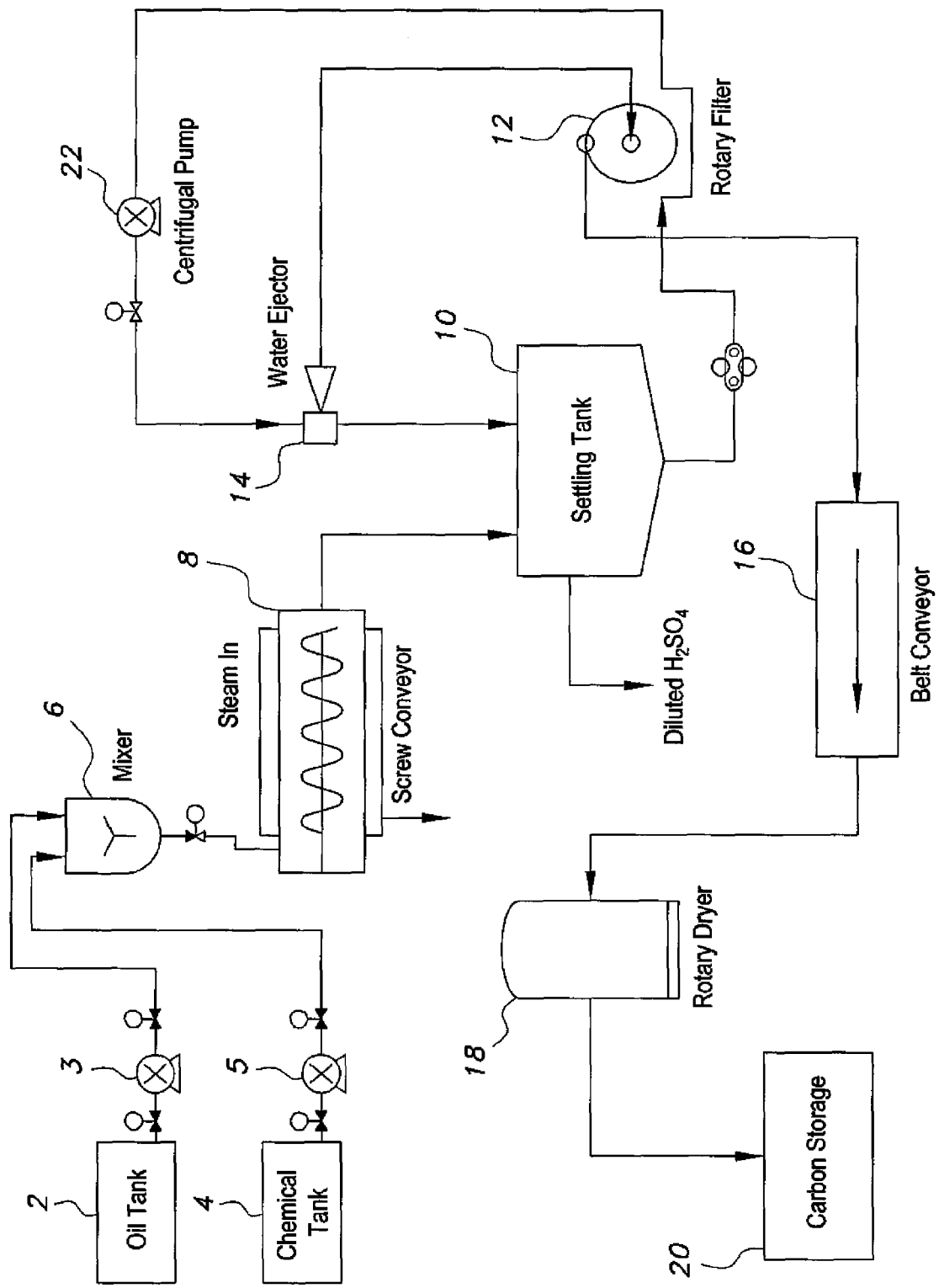

METHOD OF PRODUCING ACTIVATED CARBON FROM FUEL OIL

BACKGROUND OF THE INVENTION

1. Field of the Invention

The present invention relates to activated carbon, and particularly to a method for producing activated carbon from fuel oil.

2. Description of the Related Art

Activated carbon is a solid adsorbent material that is used widely for adsorption of gases, liquids and dissolved materials. This activated carbon can either be placed in a packed bed through which the process stream flows in or through, or the activated carbon is placed on the surface of stagnant liquid and let the carbon settle down. In both cases, the removal capacity for the activated carbon depends on its high surface area to mass ratio, as well as its surface morphology. The surface of the carbon could be enhanced by two means: (1) a physical treatment, in which the surface of the carbonaceous material is exposed to a stream of gases at high temperature; (2) chemical treatment where the carbonaceous material is exposed to phosphoric acid, zinc chloride or sodium hydroxide at low temperature (mainly less than 500° C.). The raw material for preparation of activated carbon may come from lignocelluloses, including pulp and paper, coal, coal cock, lignites, wood, nutshell, and fruit pits.

Thus, a method for producing activated carbon from fuel oil solving the aforementioned problems is desired.

SUMMARY OF THE INVENTION

The method of producing activated carbon from fuel oil according to the present invention comprises: mixing the fuel oil with an activating chemical at room temperature to produce activated fuel oil, carbonizing the activated fuel oil to produce the activated carbon, and optionally washing the activated carbon produced.

These and other features of the present invention will become readily apparent upon further review of the following specification and drawing.

BRIEF DESCRIPTION OF THE DRAWINGS

The sole drawing is a block diagram showing an apparatus for producing activated carbon from fuel oil according to the present invention.

DETAILED DESCRIPTION OF THE PREFERRED EMBODIMENTS

The method of producing activated carbon from fuel oil comprises mixing fuel oil with an activating chemical at room temperature to produce activated fuel oil, chemically activating the fuel oil, carbonizing the activated fuel oil to produce the activated carbon, and optionally washing the activated carbon produced. The activating chemical is (1) either a single acid or a mixture of acids, such as phosphoric acid, sulfuric acid and/or nitric acid, (2) or a mixture of one or more acids with aluminum chloride, ferric chloride, zinc chloride, magnesium chloride or the like. A chemically activating step using oxygen from a source (such as air, a substance containing oxygen molecules, a substance that causes the release of oxygen molecules upon contact with water, a substance that releases oxygen molecules upon a temperature change, or a substance that releases oxygen molecules upon a change in pH) may optionally be employed. Carbonizing is preferably by heating the chemically activated fuel oil up to, but not limited to, 950° C. Washing of the produced carbon is preferably by agitation of the chemically activated fuel oil in basic solution to neutralize the produced activated carbon, as well as to precipitate the heavy metals that already exist in the fuel oil. The neutralization step may be omitted to have the metals as a catalyst that is supported at the surface of the new activated carbon for catalytic reactions.

Sulfur from the fuel oil will remain at the surface of the activated carbon as a selective material for removal of mercury from gas and/or liquid streams. The activated carbon is useful for treating wastewater, industrial waste, toxic waste, biohazardous waste, radioactive waste, contaminated water, contaminated air, contaminated biological materials, contaminated synthetic materials, or contaminated extraterrestrial materials.

The present method produces a more valuable activated carbon product from fuel oil, and an activated carbon that has high efficiency. Moreover, the carbon material may be activated in a process that requires a comparatively low amount of energy, thus allowing the activated carbon to be regenerated in-situ.

The fuel oil used to make the activated carbon may, for example, possess the specific properties shown in Table 1 below.

TABLE 1

Chemical Analysis of Fuel Oil

| Property | Value |
| --- | --- |
| Specific gravity at 20° C. | 0.97 |
| Ash content (wt. %) | <0.13 |
| Asphaltene content (wt. %) | 8.3 |

In more detail, the fuel oil may be mixed with an activating chemical and heated to temperatures of from about 170° C. to about 950° C., for example, from about 170° C. to about 450° C. The mixture of fuel oil and the activating chemical may optionally be chemically activated with an oxygen source after heating to obtain a solid carbon, i.e., a wet, solid carbon. The oxygen source may be air, a substance containing oxygen molecules, a substance that causes the release of oxygen molecules upon contact with water, a substance that releases oxygen molecules upon a temperature change, or a substance that releases oxygen molecules upon a change in pH. The oxygen source may be, for example, hydrogen peroxide. The solid carbon may then be washed. For example, the solid carbon may be washed one or more times with water and dried in an oven for about two hours.

As an alternative to washing the solid carbon with water, as described above, a $CO_2/N_2$ mixture may be introduced to the solid carbon while the carbon is simultaneously heated in a muffle furnace. As yet another alternative, a mixture of $CO_2$ and steam may be introduced to the solid carbon.

The activated carbon produced from fuel oil, in accordance with the present teachings, may include sulfur on a surface thereof. The sulfur on the surface of the activated carbon may contribute to removal of mercury from gas and/or liquid streams.

FIG. 1 is a block diagram depicting an apparatus for producing activated carbon from fuel oil. According to the present method, fuel oil from a fuel oil supply 2 may be pumped into a first semi-batch reactor 3, while acids from a chemical supply 4 may be pumped into a second semi-batch reactor 5. A mixer 6, e.g., a conical mixing tank with helical ribbon agitator, may be used to collect the oil and acid to assure complete mixing before the mixture of fuel oil and acid enters the screw conveyer 8. Baffles may be used to enhance mixing and reduce vortex formation problems. The screw conveyer 8 may be a static inline mixer configured to carry or convey the mixture and to maintain oxidation of the oil. Heat may be provided to the conveyor or reactor contents via a jacket that may be attached to the conveyer surface. Steam, e.g., medium pressure steam, may be introduced into the conveyor 8 from the jacket. The screw conveyer 8 may convey the mixture to a settling tank 10. The settling tank 10 may have a conical shape at its bottom to allow all the slurry and carbon to be collected at the bottom of the tank. Then, the slurry may be transferred by gear pump 22 to a rotary filter 12 for separation of the solid carbon from aqueous solution. The aqueous solution may be removed by a water ejector 14. A belt conveyer 16 made by either fabric-reinforced rubber or plastics may carry the cake obtained from the filter 12 into a rotary dryer 18. Hot air may flow through the dryer 18 to provide water-free carbon. The produced carbon may be removed from the rotary dryer 18, packed, and stored in a dry carbon storage facility 20.

The following examples are illustrative only, and are not intended to limit the present teachings.

Example 1

Synthesis of Activated Carbon (AC1)

About 100 ml of fuel oil, having properties shown in Table 1, above, was mixed with a 200 ml mixture of concentrated acids (65 vol.% $H_2SO_4$, 20 vol.% $H_3PO_4$, 15 vol.% $HNO_3$) at 22° C. The mixture was heated gradually at ramp temperature of 5° C. until the mixture reached a temperature of 170° C. During heating, the mixture was mixed well for 3 hours. After 2 hours, the viscosity of the mixture was increased and the mixture started to solidify. At this point, air was introduced at a flow rate of 0.5 L/min. After 3 hours, a wet, solid carbon was produced. The obtained carbon (AC1) was washed several times with hot water (5 L, 500 ml each), dried in an oven at 105° C. for 2 hours, and saved for analysis.

Example 2

Synthesis of Activated Carbon with $CO_2/N_2$ (AC2)

The same procedure described in Example 1 was repeated, but the obtained carbon was not washed with water. Instead, the carbon was transferred to a reaction column (1.2 cm ID and 25 cm long) and a mixture of $CO_2/N_2$ (concentration of $CO_2$ is 1.8%) was allowed to pass through the column for 50 min, with a flow rate of 0.1 L/min. During this step, the column was placed in a muffle furnace operated at 450° C. The obtained carbon (AC2) was stored in closed containers for further analysis.

Example 3

Synthesis of Activated Carbon with $CO_2/N_2$ (AC3)

The same procedure described in Example 2 was repeated, except that hydrogen peroxide was used instead of introducing air into the mixture. The obtained carbon (AC3) was stored in closed containers for further analysis.

Example 4

Synthesis of Activated Carbon with $CO_2$ and steam (AC4)

The same procedure described in Example 2 was repeated, except that a mixture of $CO_2$ and steam (flow rate of pure $CO_2$ and steam, each 0.1 L/min) was used instead of $CO_2/N_2$. The obtained carbon (AC4) was stored in closed containers for further analysis.

Example 5

Chemical Analysis of the Fuel Oil and Activated Carbon (AC1-AC4)

Chemical analysis was performed for the fuel oil used to produce activated carbon in accordance with the methods of Examples 1-4, as well as for the activated carbon produced by each method in Examples 1-4 (AC1-AC4). The results of the chemical analysis are provided below in Table 2.

TABLE 2

| Chemical Analysis of the Fuel Oil and Produced Activated Carbon | | | | | |
|---|---|---|---|---|---|
| Element | Fuel oil | AC1 | AC2 | AC3 | AC4 |
| Sulfur | 2.8 (wt %) | 0.31 | 0.22 | 0.30 | 0.27 |
| Aluminum | 54 (ppm) | 2 (mg/Kg) | 2 (mg/Kg) | 2 (mg/Kg) | 2 (mg/Kg) |

Example 6

Adsorption of Mercury ($HgCl_2$) from solution

Nine starting samples of different concentrations, $C_0$, of $HgCl_2$ (0, 10, 20, . . . , 80 mg/L) were mixed with a fixed mass of 0.1 g of the activated carbon produced in Examples 1-4 (AC 1, AC2, AC3, and AC4) and allowed to equilibrate for 20 hours in isothermal conditions of 22° C. Then, the final concentration, $C_e$, was measured using atomic absorption spectrophotometer and the difference in concentrations between the initial and final conditions was calculated. The amount of adsorbed mercury, q, was obtained per unit mass of activated carbon, m, and volume of solution, V, according to the following equations:

$$q = \frac{C_o - C_e}{\left(\frac{m}{V}\right)}$$

The adsorption capacity of Mercury ($HgCl_2$) and other properties of each activated carbon (AC1, AC2, AC3, and AC4) produced in Examples 1-4, respectively, are provided in Table 3 below.

TABLE 3

| Properties of the Produced Activated Carbon | | | | |
|---|---|---|---|---|
| Property | AC1 | AC2 | AC3 | AC4 |
| Apparent density, g/ml | 0.46 | 0.44 | 0.44 | 0.43 |
| Moisture, % | 10.1 | 10.1 | 10.1 | 10.1 |
| PH | Acidic | Acidic | Acidic | Acidic |
| Surface area m²/g | 51 | 426 | 445 | 488 |
| Sorption Capacity for $HgCl_2$, μg/g | 1500 | 2416 | 2380 | 2905 |

It is to be understood that the present invention is not limited to the embodiments described above, but encompasses any and all embodiments within the scope of the following claims.

I claim:

1. A method of producing activated carbon from fuel oil, comprising the steps of:

mixing the fuel oil with an activating chemical at room temperature to produce activated fuel oil, wherein the activating chemical comprises an acid mixture comprising 65 vol.% sulfuric acid, 20 vol.% phosphoric acid and 15 vol.% nitric acid; and carbonizing the activated fuel oil to produce activated carbon.

2. The method of producing activated carbon from fuel oil according to claim 1, further comprising the step of washing the activated carbon after the carbonizing step.

3. The method of producing activated carbon from fuel oil according to claim 2, wherein the washing step is performed in basic solution.

4. The method of producing activated carbon from fuel oil according to claim 2, wherein the washing step is performed with water.

5. The method of producing activating carbon from fuel oil according to claim 1, further comprising the step of introducing a $CO_2N_2$ mixture to the activated carbon.

6. The method of producing activating carbon from fuel oil according to claim 1, further comprising the step of introducing a mixture of $CO_2$ and steam to the activated carbon.

7. The method of producing activated carbon from fuel oil according to claim 1, wherein the activating chemical further comprises a chloride salt selected from the group consisting of aluminum chloride, ferric chloride, zinc chloride and magnesium chloride, the chloride salt being mixed with the at least one acid.

8. The method of producing activated carbon from fuel oil according to claim 1, further comprising the step of chemically activating the fuel oil by mixing the fuel oil with an oxygen source selected from the group consisting of air, a substance containing oxygen molecules, a substance that causes the release of oxygen molecules upon contact with water, a substance that releases oxygen molecules upon a temperature change, and a substance that releases oxygen molecules upon a change in pH.

9. The method of producing activated carbon from fuel oil according to claim 8, wherein the oxygen source is air.

10. The method of producing activated carbon from fuel oil according to claim 8, wherein the oxygen source is a substance containing oxygen molecules.

11. The method of producing activated carbon from fuel oil according to claim 10, wherein the oxygen source is hydrogen peroxide.

12. The method of producing activated carbon from fuel oil according to claim 1, wherein the carbonizing step comprises the step of heating the chemically activated fuel oil to a temperature between 105° C. and 950° C.

13. The method of producing activated carbon from fuel oil according to claim 12, wherein the carbonizing step comprises heating the chemically activated fuel oil to a temperature of about 105° C.

14. The method of producing activated carbon from fuel oil according to claim 12, wherein the carbonizing step comprises heating the chemically activated fuel oil to a temperature of about 950° C.

15. A method of producing activated carbon from fuel oil, comprising the steps of:

mixing the fuel oil with an activating chemical at room temperature to produce activated fuel oil, wherein the activating chemical comprises an acid mixture comprising 65 vol.% sulfuric acid, 20 vol.% phosphoric acid and 15 vol.% nitric acid;

carbonizing the activated fuel oil to produce activated carbon; and chemically activating the fuel oil by mixing the fuel oil with an oxygen source selected from the group consisting of air and hydrogen peroxide.

16. The method of producing activated carbon from fuel oil according to claim 15, further comprising the step of washing the activated carbon with water after the carbonizing step.

17. The method of producing activated carbon from fuel oil according to claim 15, further comprising introducing a $CO_2/N_2$ mixture to the activated carbon after the carbonizing step.

18. The method of producing activated carbon from fuel oil according to claim 15, further comprising the step of introducing a mixture of $CO_2$ and steam to the activated carbon.

* * * * *